United States Patent
Smadi et al.

(10) Patent No.: US 8,982,762 B2
(45) Date of Patent: Mar. 17, 2015

(54) METHODS AND APPARATUS FOR USE IN COMMUNICATING IN A PEER-TO-PEER (P2P) NETWORK

(71) Applicant: Research in Motion Limited, Waterloo (CA)

(72) Inventors: Mohammed Nawaf Smadi, Waterloo (CA); Michael Peter Montemurro, Mississauga (CA)

(73) Assignee: BlackBerry Limited, Waterloo (CA)

( * ) Notice: Subject to any disclaimer, the term of this patent is extended or adjusted under 35 U.S.C. 154(b) by 92 days.

(21) Appl. No.: 13/628,323

(22) Filed: Sep. 27, 2012

(65) Prior Publication Data

US 2014/0086134 A1 Mar. 27, 2014

(51) Int. Cl.
*H04H 20/71* (2008.01)
*H04L 29/08* (2006.01)
*H04W 84/12* (2009.01)

(52) U.S. Cl.
CPC ............. *H04W 84/12* (2013.01); *H04L 67/104* (2013.01)
USPC ........................................................ 370/312

(58) Field of Classification Search
CPC ................................................ H04L 29/08306
USPC .......... 370/312, 328, 390, 432; 455/450, 507, 455/518
See application file for complete search history.

(56) References Cited

U.S. PATENT DOCUMENTS

| | | | |
|---|---|---|---|
| 6,920,171 B2 | 7/2005 | Souissi et al. | |
| 2006/0268873 A1 | 11/2006 | Tonjes et al. | |
| 2007/0183338 A1 | 8/2007 | Singh et al. | |
| 2008/0062948 A1 | 3/2008 | Ponnuswamy | |
| 2010/0029325 A1 | 2/2010 | Wang et al. | |
| 2010/0278065 A1 | 11/2010 | Sun et al. | |
| 2010/0325459 A1 | 12/2010 | Kangude et al. | |
| 2011/0090877 A1 | 4/2011 | Yuan | |
| 2011/0188391 A1 | 8/2011 | Sella et al. | |
| 2011/0237253 A1 | 9/2011 | Hallenstal et al. | |
| 2012/0106381 A1 | 5/2012 | Vedantham et al. | |
| 2012/0195227 A1* | 8/2012 | Vedantham et al. | 370/253 |

(Continued)

FOREIGN PATENT DOCUMENTS

| | | |
|---|---|---|
| WO | 2011046703 A2 | 4/2011 |
| WO | 2012000522 A1 | 1/2012 |

OTHER PUBLICATIONS

Wi-Fi Alliance, "Wi-Fi Peer-To-Peer (P2P) Technical Specification", Wi-Fi Alliance Specification, Jan. 1, 2010, pp. 1-159, V 1.1, XP009163866.

(Continued)

*Primary Examiner* — Edan Orgad
*Assistant Examiner* — Saumit Shah
(74) *Attorney, Agent, or Firm* — Ridout & Maybee LLP

(57) ABSTRACT

Techniques for use in a wireless device which is configured to operate as a group owner (GO) in a peer-to-peer (P2P) network are described. The group owner sends a first multicast message to one or more first P2P devices in the P2P network. The first multicast message includes first notice of absence (NoA) data. The group owner also sends a second multicast message to one or more second P2P devices in the P2P network. The second multicast message includes second NoA data. Partitioning in the P2P network in this fashion may be set based on the different types of communications established with the P2P devices (e.g. different traffic classes or Quality of Service (QoS) types).

22 Claims, 11 Drawing Sheets

(56) References Cited

U.S. PATENT DOCUMENTS

2013/0028156 A1* 1/2013 Vedantham et al. .......... 370/311
2013/0064161 A1* 3/2013 Hedayat et al. .............. 370/312

OTHER PUBLICATIONS

Wi-Fi Alliance, "Wi-Fi Certified Wi-Fi Direct personal, portable Wi-Fi Technology", Oct. 1, 2010, pp. 1-14, XP0550041124, URL:http://www.wi-fi.org/knowledge-center/white-papers/wi-fi-certified-wi-fi-direct%E2%84%A2- personal-portable-wi-fi%C2%AE-connect-devices.
European Search Report and Written Opinion for EP patent application # 12186237.9-1857, Feb. 19, 2013.
Mur et al., "Contributions to QoS and Energy Efficiency in Wi-Fi Networks", Sep. 2011, pp. 1-43, Polytechnic University of Catalonia, Barcelona, Spain.
Jiang et al., "A Multicast Based Bandwidth Saving Approach for Wireless Live Streaming System", International Journal of Smart Home, Jan. 2008, pp. 1-16, vol. 2, No. 1.
Kamboj et al., "Power Aware Multicast Reactive Routing Protocol (PAMRRP)", IJCSNS International Journal of Computer Science and Network Security, Aug. 2008, pp. 351-357, vol. 8 No. 8.
Kuo et al., "CRT-MAC: A Power-Saving Multicast Protocol in the Ayncrhronous Ad-Hoc Networks", 2008 IEEE International Conference on Sensor Networks, Ubiquitous and Trustworthy Computing, Jun. 11-13, 2008, pp. 1, http://www.computer.org/portal/web/csdl/doi/10.1109/SUTC.2008.40.
Wi-Fi Alliance, "Wi-Fi Peer-To-Peer (P2P) Technical Specification", 2010, pp. 1-159, Version 1.1, Wi-Fi Alliance Technical Committee P2P Task Group.

* cited by examiner

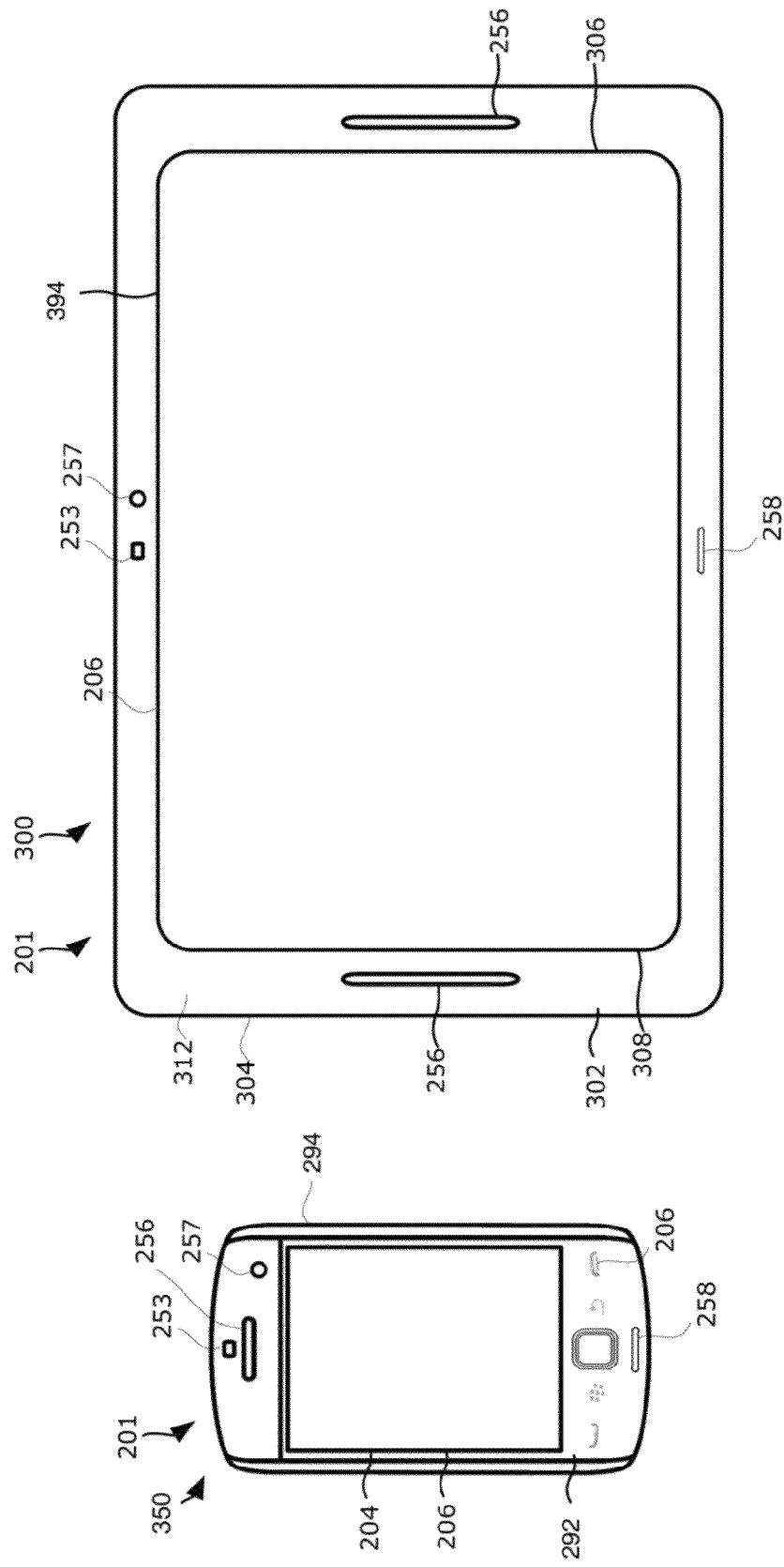

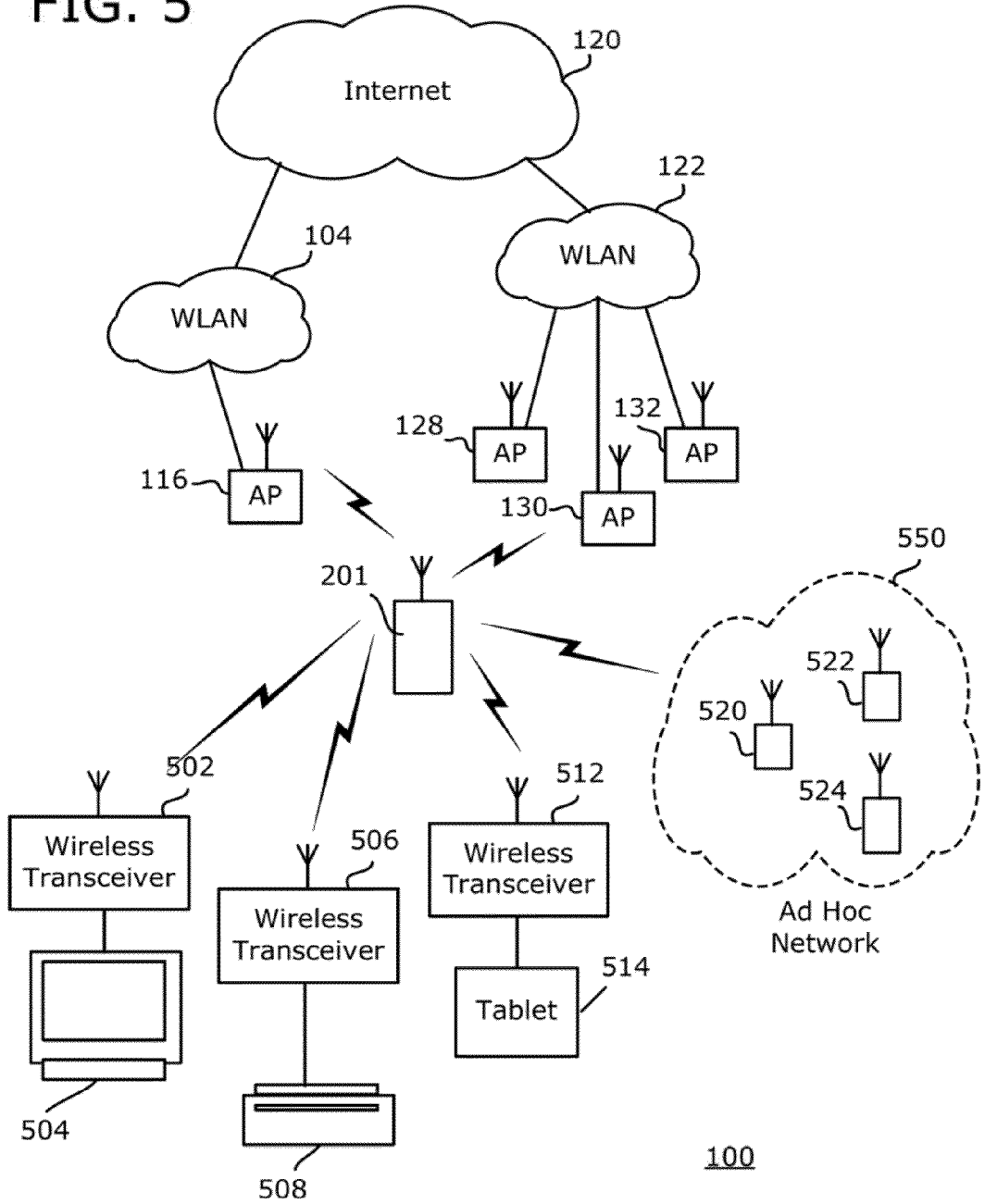

US 8,982,762 B2

METHODS AND APPARATUS FOR USE IN COMMUNICATING IN A PEER-TO-PEER (P2P) NETWORK

BACKGROUND

1. Field of the Technology

The present disclosure relates generally to communication devices configured for wireless communications, such as IEEE 802.11 based communications, including techniques for use in communicating in a peer-to-peer (P2P) network.

2. Description of the Related Art

A wireless communication device, such as a portable wireless telephony device or smartphone, may be configured to communicate in wireless communication networks. For example, such a device may communicate via access points (APs) of wireless local area networks (WLANs) in accordance with IEEE 802.11 standards or the like. Such devices may also communicate using peer-to-peer communication techniques, for example, in accordance with the Wi-Fi Peer-To-Peer (P2P) Technical specification, and/or be certified as a "Wi-Fi Direct" device.

There is a need for efficiently facilitating communications in these and similar environments.

BRIEF DESCRIPTION OF THE DRAWINGS

Embodiments of present disclosure will now be described by way of example with reference to attached figures, wherein:

FIGS. 3 and 4 are some examples of different types of wireless devices of the present disclosure, which include a smartphone (FIG. 3) and a tablet computer (FIG. 4);

FIG. 5 is an illustrative representation of a part of the communication system of FIG. 1 which may involve different types of wireless networks and communications;

DETAILED DESCRIPTION OF THE PREFERRED EMBODIMENTS

Techniques for use in a wireless device which is configured to operate as a group owner (GO) in a peer-to-peer (P2P) network are described herein. The group owner sends a first multicast message to one or more first P2P devices in the P2P network. The first multicast message includes first notice of absence (NoA) data. The group owner also sends a second multicast message to one or more second P2P devices in the P2P network. The second multicast message includes second NoA data. Partitioning in the P2P network in this fashion is set based on the different types of communications established with the P2P devices (e.g. different traffic classes or Quality of Service (QoS) types).

Figure 1:
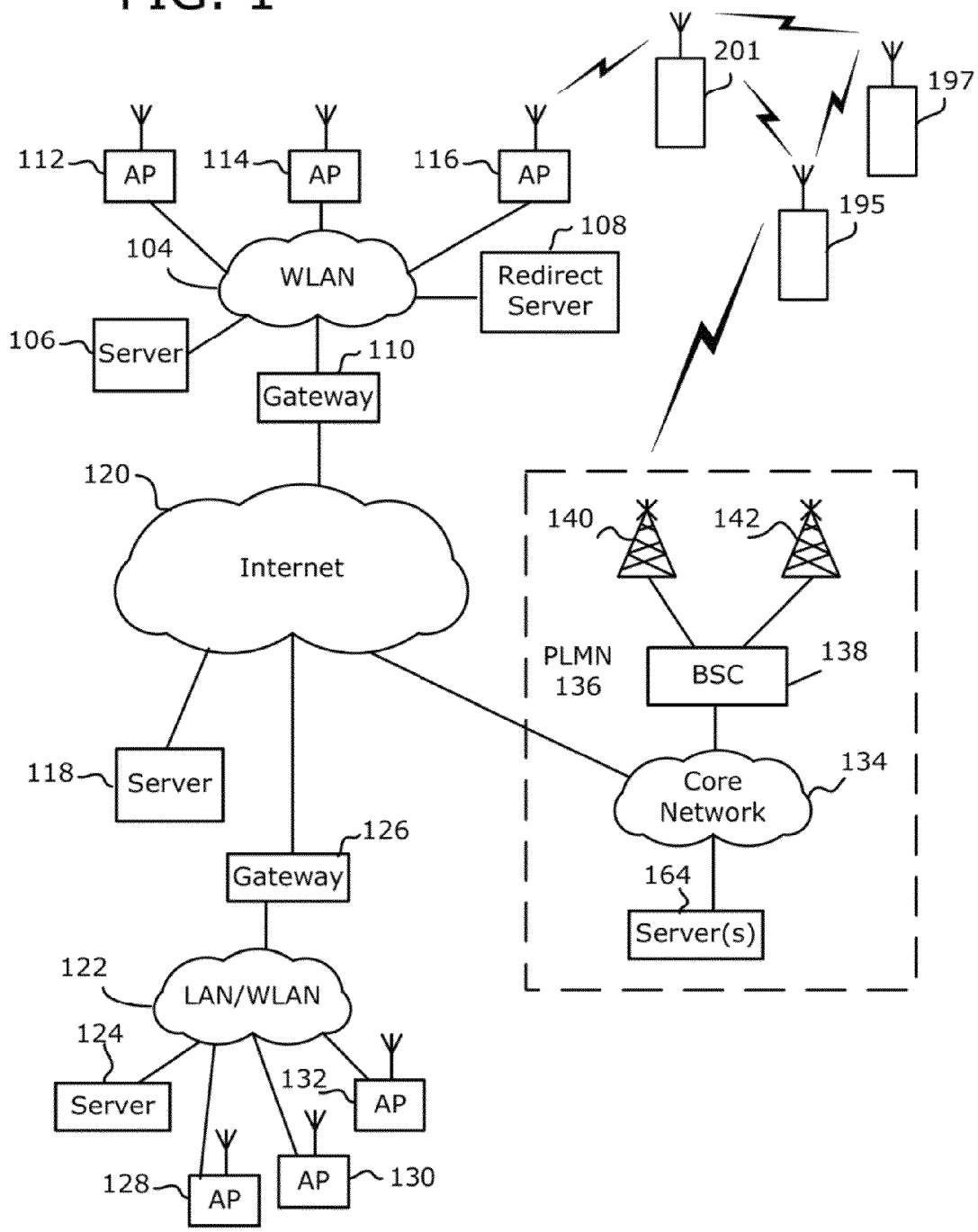
FIG. 1 is an illustrative representation of a communication system which includes wireless communication networks (e.g. WLANs) with which a wireless communication device may communicate.

To illustrate one environment within which the techniques of the present disclosure may be practiced, FIG. 1 illustrates a wireless communication device 201 which may communicate in a communication system 100. In the communication system 100, wireless device 201 may communicate with one or more wireless communication networks. For example, wireless device 201 may communicate with a wireless communication network 104 which is a wireless local area network (WLAN). Here, wireless network 104 and wireless device 201 may operate in accordance with IEEE 802.11 standards.

In this example, wireless network 104 has a plurality of wireless access points (APs) 112, 114, and 116 for wireless communications with wireless device 201. WLANs may be identified by a wireless device 201 with use of a wireless network identifier which is communicated from the WLAN. The wireless network identifier may be, for example, a Set Service Identifier (SSID) or Extended SSID (ESSID). In this example, wireless network 104 includes one or more servers 106, a redirect server 108, and a gateway 110. Server 106 may provide data, applications, and/or functionality for communication services for wireless device 201.

Wireless network 104 may be a public Wi-Fi "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to wireless device 201 to provide data for producing information (e.g. Web page information) which is rendered in a visual display of wireless device 201 via a Web browser application. The information may solicit a user response. For example, the information may solicit a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Wireless device 201 may also operate for communications in other different wireless networks, such as a wireless network 122 which is also a WLAN. In this example, wireless network 122 is a private communication network of an enterprise (e.g. an organization, a company, a corporation, etc.) of wireless device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120 gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, wireless device 201 may be enabled to maintain data synchronization with a server (e.g. server 106 or 118) for user data of an application associated with a user account. The application of wireless device 201 and the server may be or include, for example, an electronic mail (e-mail) application program for the communication of e-mail messages.

Wireless device 201 may be additionally configured to access communication services via a Public Land Wireless Network (PLMN) 136 (e.g. a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, wireless device 201 may be configured in accordance with one or more cellular telecommunication standards, such as Global Systems for Mobile (GSM) and/or General Packet Radio Service (GPRS) technologies. However, such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Further, in additional to being operative for communications with infrastructure WLANs (e.g. IEEE 802.11 infrastructure WLANs), wireless device 201 may additionally or alternatively communicate using peer-to-peer communication techniques, for example, in accordance with the Wi-Fi Peer-To-Peer (P2P) Technical specification, and/or be certified as a "Wi-Fi Direct" device. The Wi-Fi Peer-To-Peer (P2P) Technical specification is hereby incorporated by reference herein.

Accordingly, illustrating further in FIG. 1, wireless device 201 and one or more other wireless devices 195 and 197 in FIG. 1 may be operative to establish Wi-Fi P2P network connections with each other in a Wi-Fi P2P network. Here, one of the communicate devices may be configured to enter into an AP mode of operation, so that other communication devices may associate with them for direct RF communications therebetween. In some environments, a wireless device may operate in an AP mode of operation as what is referred to as a group owner (GO). Such operation provides a benefit due to the high data rates available over WLAN links. Here, again, data may be communicated directly between the wireless devices without the data traversing any wireless network infrastructure, where one of the devices is set to operate or serve as an AP (switching operation from as an end terminal) and the other device operates as an end terminal to associate and connect with the AP (i.e. wireless device 201 operating as an AP) for communications. Wireless device 201 may operate such that, when operating as an AP with other communication devices 195 and 197, it also operates as a client station with another AP (see e.g. discussion later in relation to FIG. 5).

Figure 2:
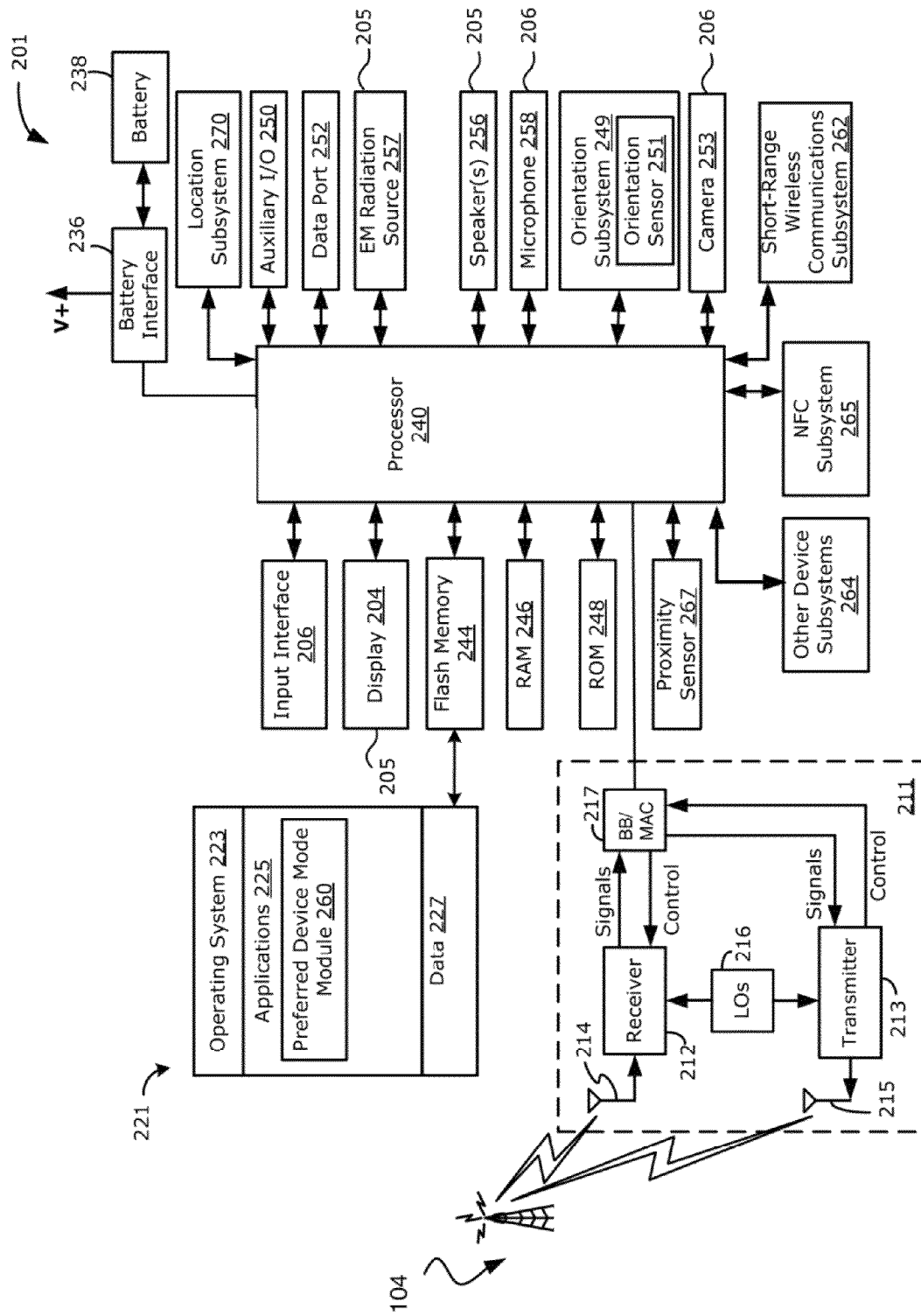
FIG. 2 is an example of a schematic block diagram of the wireless device of FIG. 1.

Reference will now be made to FIG. 2 which illustrates one example of a schematic block diagram of wireless device 201 in which example embodiments may be applied. In the illustrated example embodiment, wireless device 201 is a communication device and, more particularly, is a mobile communication device having data and voice communication capabilities, and configured to communicate with other computer systems (e.g. via the Internet). It will, however, be appreciated that wireless device 201 may take other forms.

Depending on the functionality provided by wireless device 201, in various example embodiments wireless device 201 may be a multiple-mode communication device configured for both data and voice communication, a mobile telephone, such as a smartphone, a wearable computers such as a watch, a tablet computer such as a slate computer, a personal digital assistant (PDA), or a computer system. Wireless device 201 may take other forms apart from those specifically listed above. The electronic device may also be referred to as a mobile communications device, a communication device, a mobile device and, in some cases, as a device.

Wireless device 201 includes a controller including one or more processor 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 2 perform communication-related functions, whereas other subsystems may provide "resident" or on-device functions.

In at least some example embodiments, wireless device 201 may include a touchscreen display which acts as both an input interface 205 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (of FIG. 3) which surrounds the display 204. In such example embodiments, the frame 312 (of FIG. 3) may be referred to as an active frame since it is capable of acting as an input interface 206. In at least some example embodiments, the touch-sensitive overlay may extend to the sides of wireless device 201.

As noted above, in some example embodiments, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at least some example embodiments, wireless device 201 may communicate with any one of a plurality of stations or access points (APs) of wireless network 104 within its geographic coverage area. Wireless device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some example embodiments, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output. Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

Wireless device 201 may, in at least some example embodiments, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some example embodiments, wireless device 201 may include a plurality of speakers 256. For example, in some example embodiments, wireless device 201 may include two or more speakers 265. The two or more speakers 256 may, for example, be disposed in spaced relation to one another. That is, in at least some example embodiments, wireless device 201 may include a first speaker and a second speaker and the first speaker and the second speaker may be spatially separated from one another within wireless device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some example embodiments, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some example embodiments, wireless device 201 includes a front facing camera 253. A front facing camera is a camera which is generally located on a front face of wireless device 201. The front face is typically the face on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of wireless device 201 and/or the housing of wireless device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, wireless device 201 includes an electromagnetic (EM) radiation source 257. In at least some example embodiments, the EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, in at least some example embodiments, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, wireless device 201 is provided with a service routing application programming interface (API) which provides an application with the ability to route traffic through a serial data (i.e., USE) or Bluetooth® (Bluetooth® is a registered trademark of Bluetooth SIG, Inc.) connection to a host computer system using standard connectivity protocols. When a user connects their wireless device 201 to the host computer system via a USB cable or Bluetooth® connection, traffic that was destined for wireless network 104 is automatically routed to wireless device 201 using the USE cable or Bluetooth® connection. Similarly, any traffic destined for wireless network 104 is automatically sent over the USE cable Bluetooth® connection to the host computer system for processing.

Wireless device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some example embodiments, be a wireless device which is the same or similar to wireless device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices.

Wireless device 201 stores data 227 in an erasable persistent memory, which in one example embodiment is the flash memory 244. In various example embodiments, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g. flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as preferred device mode module 260. In the example embodiment of FIG. 1, the preferred device mode module 260 is implemented as a stand-alone application 225. However, in other example embodiments, the preferred device mode module 260 could be implemented as part of the operating system 223 or another application 225.

The software applications 225 on wireless device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device. Referring now to FIG. 3, what is shown is a front view of an example wireless device 201 which is a smartphone 350. The smartphone 350 is a mobile phone which offers more advanced computing capability than a basic non-smartphone cellular phone. For example, the smartphone 350 may have the ability to execute third party applications which are stored on the smartphone.

The smartphone 350 may include the components discussed above with reference to FIG. 2 or a subset of those components. The smartphone 350 includes a housing 294 which houses at least some of the components discussed above with reference to FIG. 2.

In the example embodiment illustrated, the smartphone includes a display 204, which may be a touchscreen display which acts as an input interface 206. The display 204 is disposed within the smartphone 350 so that it is viewable at a front side 292 of the smartphone 350. That is, a viewable side of the display 204 is disposed on the front side 292 of the smartphone. In the example embodiment illustrated, the display 204 is framed by the housing 294.

The example smartphone 350 also includes other input interfaces 206 such as one or more buttons, keys or navigational input mechanisms. In the example illustrated, at least some of these additional input interfaces 205 are disposed for actuation at the front side 292 of the smartphone.

The example smartphone also includes a speaker 256. In the example embodiment illustrated, the smartphone includes a single speaker 256 which is disposed vertically above the display 204 when the smartphone 350 is held in a portrait orientation where its height is longer than its width. The speaker 256 may be disposed on the front face of the smartphone 350.

While the example smartphone 350 of FIG. 3 includes a single speaker 256, in other example embodiments, the smartphone 350 may include a greater number of speakers 256. For example, in at least some example embodiments, the smartphone 350 may include a second speaker 256 which is disposed vertically below the display 204 when the smartphone is held in a portrait orientation where its height is longer than its width (i.e. the orientation illustrated in FIG. 3).

The example smartphone 350 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 350 also includes a front facing camera 253 which may be located vertically above the display 204 when the smartphone 350 is held in a portrait orientation where its height is longer than its width. The front facing camera 253 is located so that it may capture images of objects which are located in front of and/or surrounding the front side of the smartphone 350.

The example smartphone 350 also includes an electromagnetic radiation source 257. The electromagnetic radiation source 257 is disposed on the front side 292 of the smartphone 350. In this orientation, electromagnetic radiation which is produced by the electromagnetic radiation source 257 may be projected onto objects which are located in front of and/or surrounding the front side of the smartphone 350. Such electromagnetic radiation (or the projection of electromagnetic radiation onto objects) may be captured on images obtained by the camera 253.

Example Tablet Electronic Device. The wireless device may be a tablet computer 300 ("tablet"), one of which is illustrated in FIG. 4. Tablet computer 300 of FIG. 4 may include many of the same features and components of the smartphone 350 of FIG. 3. However, tablet computer 300 of FIG. 3 is generally larger than the smartphone 350 of FIG. 3. Tablet computer 300 may include the components discussed above with reference to FIG. 2 or a subset of those components. Tablet computer 300 includes a housing 394 which houses at least some of the components discussed above with reference to FIG. 2.

Tablet computer 300 includes a display 304, which may be a touchscreen display which acts as an input interface 206. The display 304 is disposed within tablet computer 300 so that it is viewable at a front side 302 of tablet computer 300. That is, a viewable side of the display 304 is disposed on the front side 302 of tablet computer 300. In the example embodiment illustrated, the display 304 is framed by the housing 394, with use of a frame 312 which surrounds the display 304. The frame 312 is portion of the housing 394 which provides a border around the display 304. In at least some example embodiments, the frame 312 is an active frame 312. That is, the frame has a touch sensitive overlay which allows wireless device 201 to detect a touch applied to the frame, thereby allowing the frame 312 to act as an input interface 206 (of FIG. 1).

The example tablet computer 300 includes a plurality of speakers 256. In the example embodiment illustrated, the tablet includes two speakers 256. The two speakers 256 are disposed on opposing sides of the display 304. More particularly, when tablet computer 300 is held in a landscape orientation such as the orientation illustrated in FIG. 3) where its width is longer than its height, one of the two speakers is disposed on a right side 306 of the display 304 and one of the speakers is disposed on the left side 308 of the display 304. Both speakers 256 are disposed on the front side 302 of tablet computer 300.

The example tablet computer 300 also includes a microphone 258. In the example illustrated, the microphone 258 is vertically disposed below the display 304 when the tablet computer is held in the landscape orientation illustrated in FIG. 4. The microphone 258 may be located in other locations in other example embodiments.

The example tablet computer 300 also includes a front facing camera 253 which may be located vertically above the display 304 when tablet computer 300 is held in a landscape orientation (i.e. the orientation of FIG. 3). The front facing camera 253 is located so that it may capture images of objects which are located in front of and/or surrounding the front side of tablet computer 300.

The example tablet computer 300 also includes an electromagnetic radiation source 257. The electromagnetic radiation source 257 is disposed on the front side 304 of tablet computer 300. In this orientation, electromagnetic radiation which is produced by the electromagnetic radiation source 257 may be projected onto objects which are located in front of and/or surrounding the front side 302 of tablet computer 300. Such electromagnetic radiation (or the projection of electromagnetic radiation onto objects) may be captured on images obtained by the camera 253.

Although a specific wireless device 201 has just been described, any suitable wireless communication device or terminal may be part of the methods and apparatus which will be described in fuller detail below. Also, although the description of the architecture relates to a specific example for illustration, where the wireless network or WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Example Wireless Network Configurations Connections. FIG. 5 is an illustrative representation of a part of the communication system 100 of FIG. 1, which illustrates different types of wireless network configurations which may involve wireless device 201. Wireless networks 104 and 122 are WLANs of the traditional "WLAN infrastructure" type, which typically provide for external network connectivity, as described earlier in relation to FIG. 1. For example, wireless networks 104 and 122 are configured to provide or facilitate access to the Internet 120 (or other communication network, such as a public communication network) for wireless device 201 when connected therewith. In this case, wireless device 201 may make use of its WLAN profiles for connecting with such WLANs.

Other wireless networking configurations in FIG. 5 include Wi-Fi peer-to-peer (P2P) networking configurations. For these networking configurations, wireless device 201 may operate as a group owner (GO) in relation to various wireless devices. When wireless device 201 is utilized as such, using one or more Wi-Fi P2P network connections, data may be communicated "directly" between wireless device 201 and the other devices (i.e. without the data traversing any fixed wireless network infrastructure).

In FIG. 5 it is shown that wireless device 201 may establish a Wi-Fi P2P connection with a display device 504 (or monitor) which includes a wireless transceiver 502. Such Wi-H P2P network connection may be suitable for applications such as, for example, a streaming media application, or a display or presentation application. It is also shown that wireless device 201 may establish a Wi-Fi P2P network connection with a printer device 508 which includes a wireless transceiver 506. Such Wi-Fi P2P network connection may be suitable for applications such as, for example, a print application or a facsimile application. Even further in FIG. 5, it is shown that wireless device 201 may establish a Wi-Fi P2P network connection with a tablet 514 which includes a wireless transceiver 512. An example tablet was previously shown and described in relation to FIG. 4. Such iii-Fi P2P network connection may be suitable for an applications such as, for example, a "bridge" or "bridging" application, where wireless device 201 is further configured for cellular telecommunications (e.g. equipped with a cellular transceiver) but tablet 514 is not. In such application, tablet 514 is able to achieve external network (e.g. Internet) connectivity, being connected to wireless device 201 for communications via the cellular telecommunication network. It is further shown in FIG. 5 that wireless device 201 may establish a Wi-H P2P network connection in an ad hoc wireless network 550 which includes one or more other wireless devices 520, 522, and 524. Such Wi-Fi P2P network connection may be suitable for applications such as, for example, a file sharing application, a conference meeting application, a game or gaming application, or a military application. Such ad hoc wireless networks may or may not provide external network (e.g. Internet) connectivity.

As described earlier, wireless device 201 has different types of applications stored therein. These applications may include, as examples, a messaging application, a voice telephony application, a Web browsing application, a streaming media application, a file sharing application, a game application, a printer application, a facsimile application, a display or presentation application, a military application, as examples. Wireless device 201 is optimized to establish the appropriate wireless networks based on which type of application is invoked.

Figure 6:
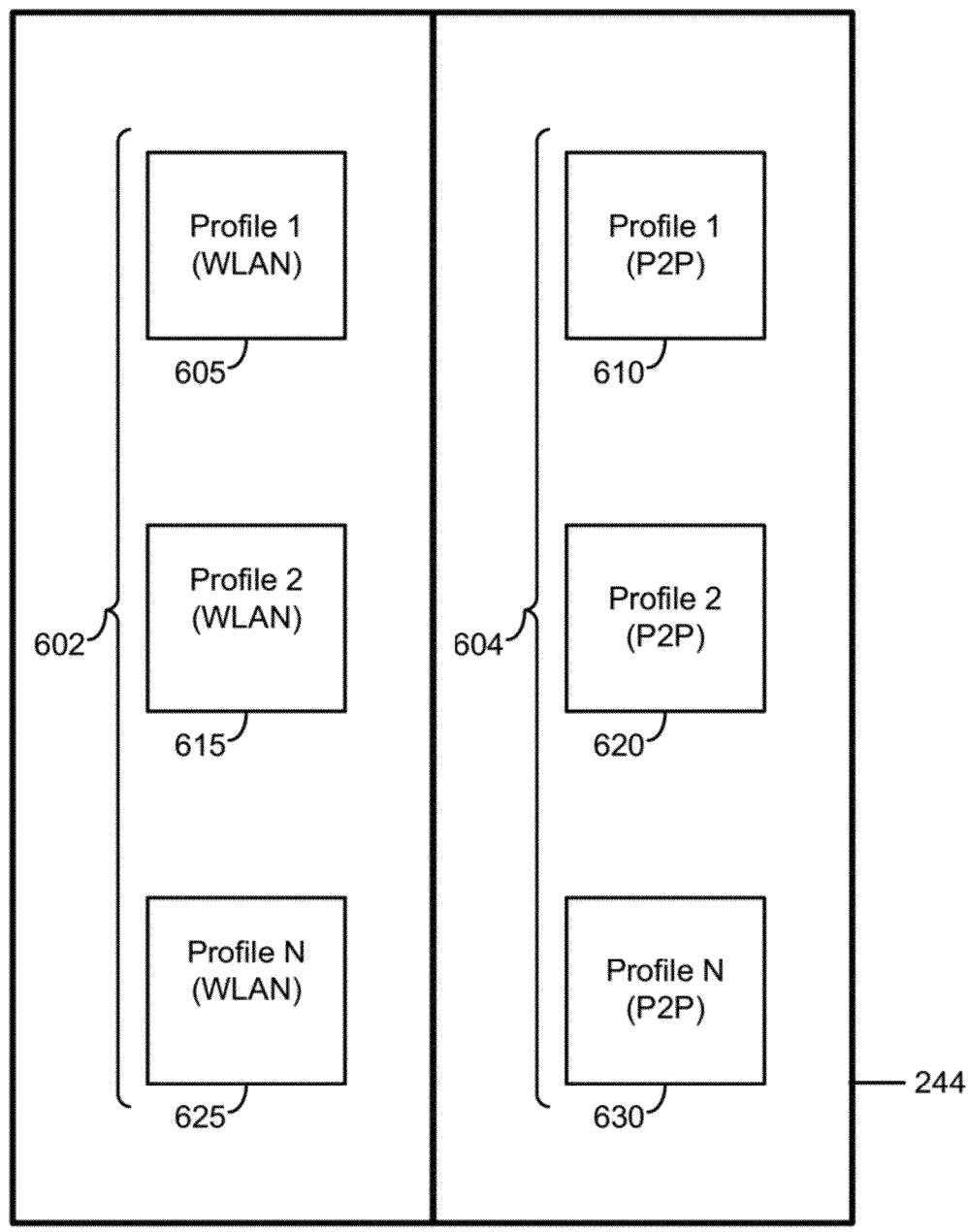
FIG. 6 is an illustrative representation of a portion of memory of the wireless device, where the memory has a plurality of profiles stored therein, where each profile is associated with a first type of wireless connection (e.g. a client station type) or a second type of wireless connection (e.g. a peer-to-peer type)

Referring now to FIG. 6, an illustrative representation of another portion of memory 224 of wireless device 201 is shown. Memory 224 is shown to store a plurality of profiles for wireless networking. The profiles include one or more profiles 602 associated with WLAN infrastructure networks, and/or one or more profiles 604 associated with applications and/or services which utilize Wi-Fi P2P network connections. In FIG. 6, profiles 602 are shown to include profiles 605, 615, and 625, whereas profiles 604 are shown to include profiles 610, 620, and 630. Profiles 602 may be or be referred to as WLAN profiles, whereas profiles 604 may be or be referred to as Wi-Fi P2P networking profiles or Wi-Fi Direct profiles.

Each one of profiles 602 is associated with a particular WLAN infrastructure network, and includes a plurality of parameters and/or properties for accessing the particular WLAN. The WLAN information may include an identification which identifies the WLAN to access (e.g. a SSID or ESSID). The WLAN information may also include authentication and/or security information for obtaining access to the WLAN (e.g. a network key, passkey, security key, etc.). One of the WLANs appropriate WLAN from profiles 602 will be selected for communication when available, as prioritized in a prioritized list of the profiles 602. When not connected in a WLAN, the wireless device normally operates to search for WLANs identified in its stored profiles 602. Conversely, the wireless device normally refrains from searching for and communicating in WLANs other than those WLANs identified in stored profiles 602.

On the other hand, each one of profiles 604 is associated with one of the applications and/or services which utilizes a particular type and/or configuration of Wi-Fi P2P network (or Wi-Fi Direct network). Each one of profiles 604 includes parameters and/or properties associated with establishing the particular type and/or configuration of Wi-Fi P2P network for the application and/or service. Profiles 604 may be created, viewed, updated, enabled, and disabled.

Properties in profiles 604 may include the following. Properties may include a device type property which indicates a device type of the device for the Wi-Fi P2P network connection to be established. The device type may be the device type that is being searched for in the discovery. Note that there may be two device types specified in the profile: a primary device type and a secondary device type. The device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The device type may be or include category identification (ID) and/or subcategory identification (ID). Examples of such types are as follows: a computer, an input device, a printer, a camera, a display (monitor), a gaming device, an audio device, a multimedia device, or a telephone device.

Properties may additionally or alternatively include an advertised device type property which indicates the device type of wireless device 201. The advertised device type may be the device type to be advertised by wireless device 201. Note that there may be two advertised device types specified in the profile: a primary advertised device type, and a secondary advertised device type. The advertised device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The advertised device type may be or include category identification (ID) and/or subcategory identification (ID). Examples of such types are as follows: a computer, an input device, a printer, a camera, a display (monitor), a gaming device, an audio device, a multimedia device, or a telephone device.

Properties in profiles 604 may additionally or alternatively include a service type property which indicates a service type which identifies the service associated with the device. For example, the service types may be or include the appropriate service types as described in the Wi-Fi Peer-To-Peer (P2P) Technical specification (e.g. in Annex E thereof). Examples of such types are as follows: a file sharing service, or a printing service. Alternatively, examples of such types are as follows: Apple File Sharing (AFP) service (or AFP over TCP service), or IP Printing (IPP) Bonjour service.

Properties in profiles 604 may additionally or alternatively include a discovery mode property which indicates a mode utilized for the discovery of devices for the Wi-Fi P2P network connection. The discovery mode property may be set to one of the following: a triggered mode of discovery, or a periodic mode of discovery. Alternatively, the discovery mode may be set to one of the following: a triggered mode of discovery, a periodic mode of discovery, or a Group Owner (GO) mode of discovery.

Properties in profiles 604 may additionally or alternatively include a persistent property or indication which indicates whether or not the Wi-Fi P2P network is persistent. If the network is persistent, when an application is opened or activated, the wireless device connects to a previously-established Wi-Fi P2P network.

Properties in profiles 604 may additionally or alternatively include a coexistence indication or property which indicates whether the Wi-Fi P2P network connection associated with this profile may be maintained while the wireless device operates as a client in an infrastructure network. Properties may additionally or alternatively include another coexistence indication or property which indicates whether the Wi-Fi P2P network connection associated with this profile may be maintained while maintaining another Wi-Fi P2P network connection.

More On Use Cases; Additional/Alternative Profile Details. It is noted that many peer-to-peer "use cases" for Wi-Fi P2P networking lend themselves to different modes of operation. For example, if a wireless device supports a network gateway feature (e.g. a mobile hotspot or MHO feature), then the wireless device may be configured to establish a persistent Wi-Fi P2P network when the service is enabled. As another example, the same wireless device may require a printer service to allow an application to print a document. In this case, the Wi-Fi P2P network may be established on-demand based on an application trigger. In another example, a social networking application may periodically search for other communication devices running the same social networking application, which may result in the wireless device operating in a periodic discovery mode for other devices which advertise the same service.

To accommodate for such various use cases, profiles associated with the various application/services utilizing Wi-Fi P2P networks are created and stored on the wireless device. These profiles are enabled when needed, such as enabled in response to an activation of an application associated therewith. Further, the profiles may be enabled concurrently.

In one embodiment, the profiles may have data structures defined for compatibility with the Wi-Fi Peer-To-Peer (P2P) Technical specification. Each profile may include information specific to Wi-Fi P2P network operation, including device discovery behavior, service discovery options, co-existence with infrastructure connectivity, as well as operational characteristics of the network (e.g. whether it is persistent, or triggered on application launch). These profiles may be provisioned as defaults in the wireless device, and/or may be configured by applications when installed.

The profiles are used to manage the behavior of the WLAN or Wi-H driver of the wireless device to accommodate for the various application/services. The driver may be configured to support each particular use case. More particularly, the driver may use the profile information to manage peer-to-peer communications on the wireless device, as well as to arbitrate between Wi-Fi P2P network and other modes of connectivity (e.g. infrastructure STA mode). The driver may be further configured to support other application requirements, such as sleep modes, discovery modes, and/or co-existence with an infrastructure network connection over WLAN, etc. An example set of properties and/or parameters relating to the behavioral characteristics were provided earlier above.

Figure 7:
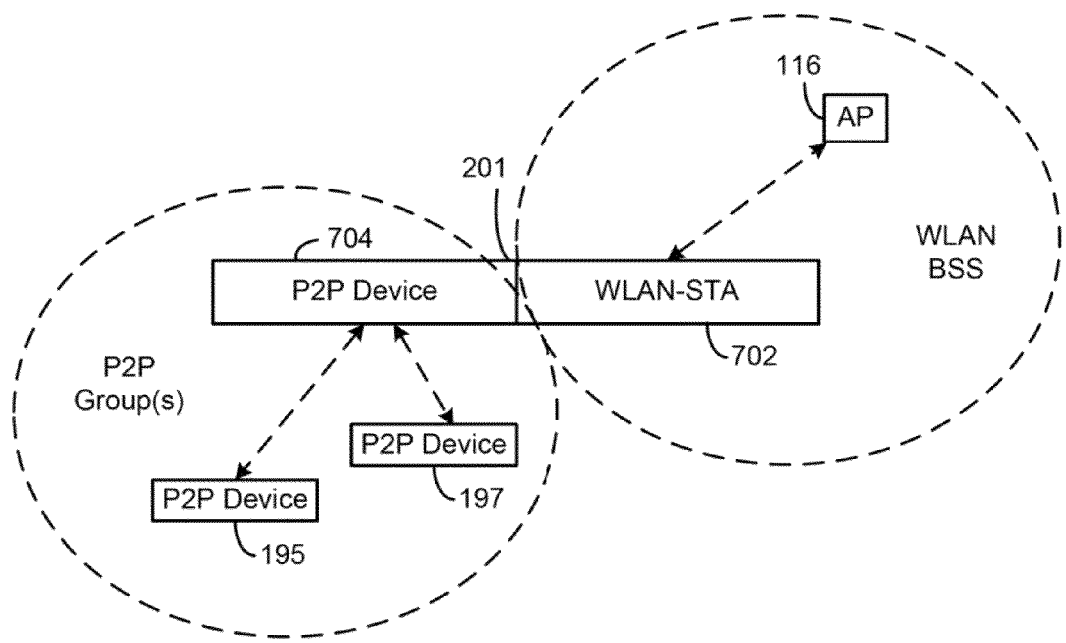
FIG. 7 is a block diagram for illustrating concurrent operations of the wireless device which may operate as a group owner (GO) in a P2P network.
Figure 8:
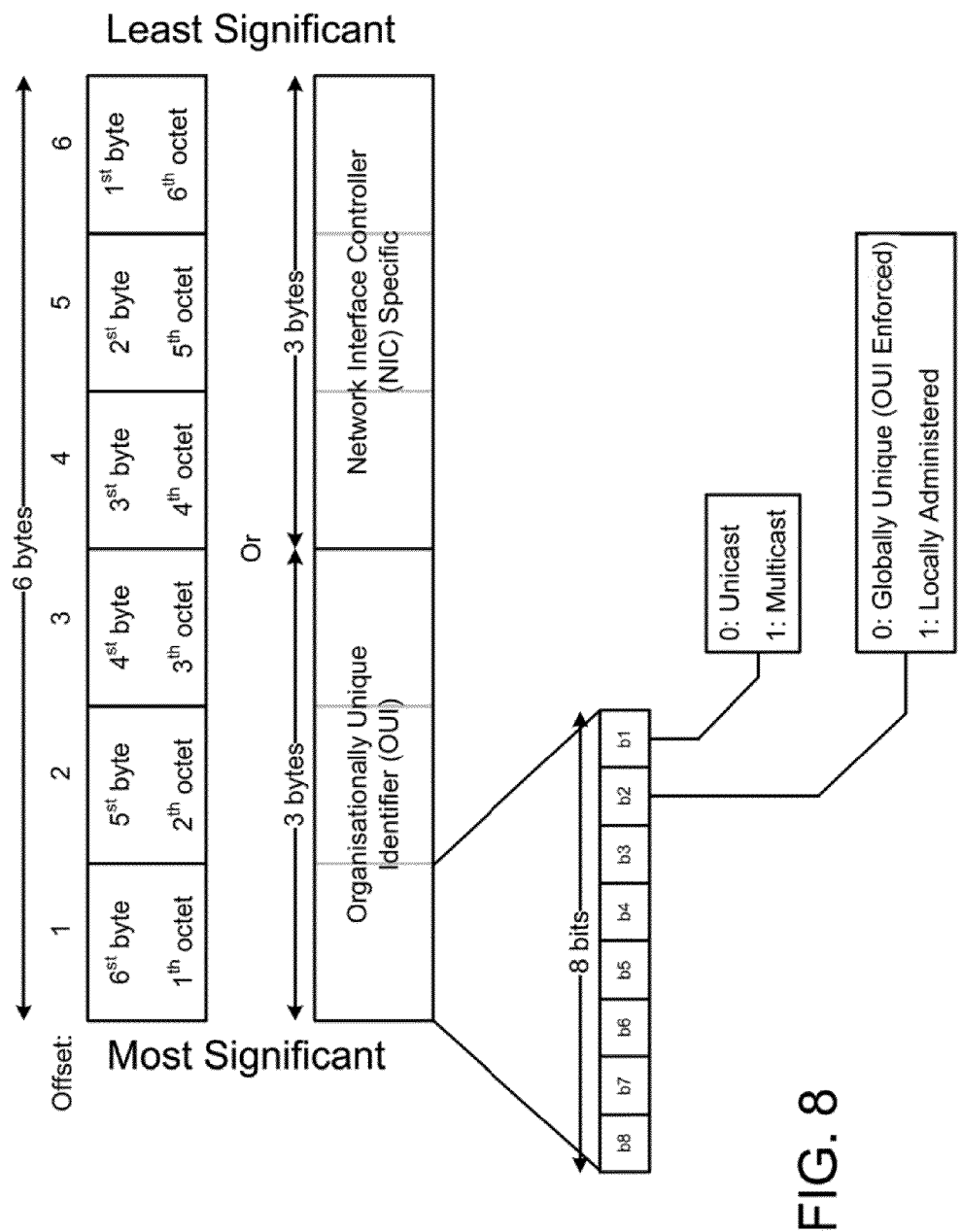
FIG. 8 is an illustration of the format of a message which may be utilized for multicast addressing for communicating different Notice of Absence (NoA) data to different multicast groups.

FIG. 7 illustrates that wireless device 201 may be configured to communicate concurrently with two different wireless networks. In this example, wireless device 201 may be particularly configured as a "P2P concurrent device" in accordance with the protocols in the Wi-Fi Peer-To-Peer (P2P) Technical specification. Here, wireless device 201 has a first MAC entity 702 operating as a client station in a WLAN (i.e. a "WLAN-STA") (e.g. with AP 116 of the WLAN) and a second MAC entity 704 operating as a peer-to-peer device (e.g. with P2P device 195 and P2P device 197). Dual MAC functionality may be implemented as, for example, two virtual MAC entities over one physical layer (PHY) entity. Thus, wireless device 201 may operate to concurrently maintain two different types of wireless connections, via the same wireless transceiver or PHY entity.

Figure 9:
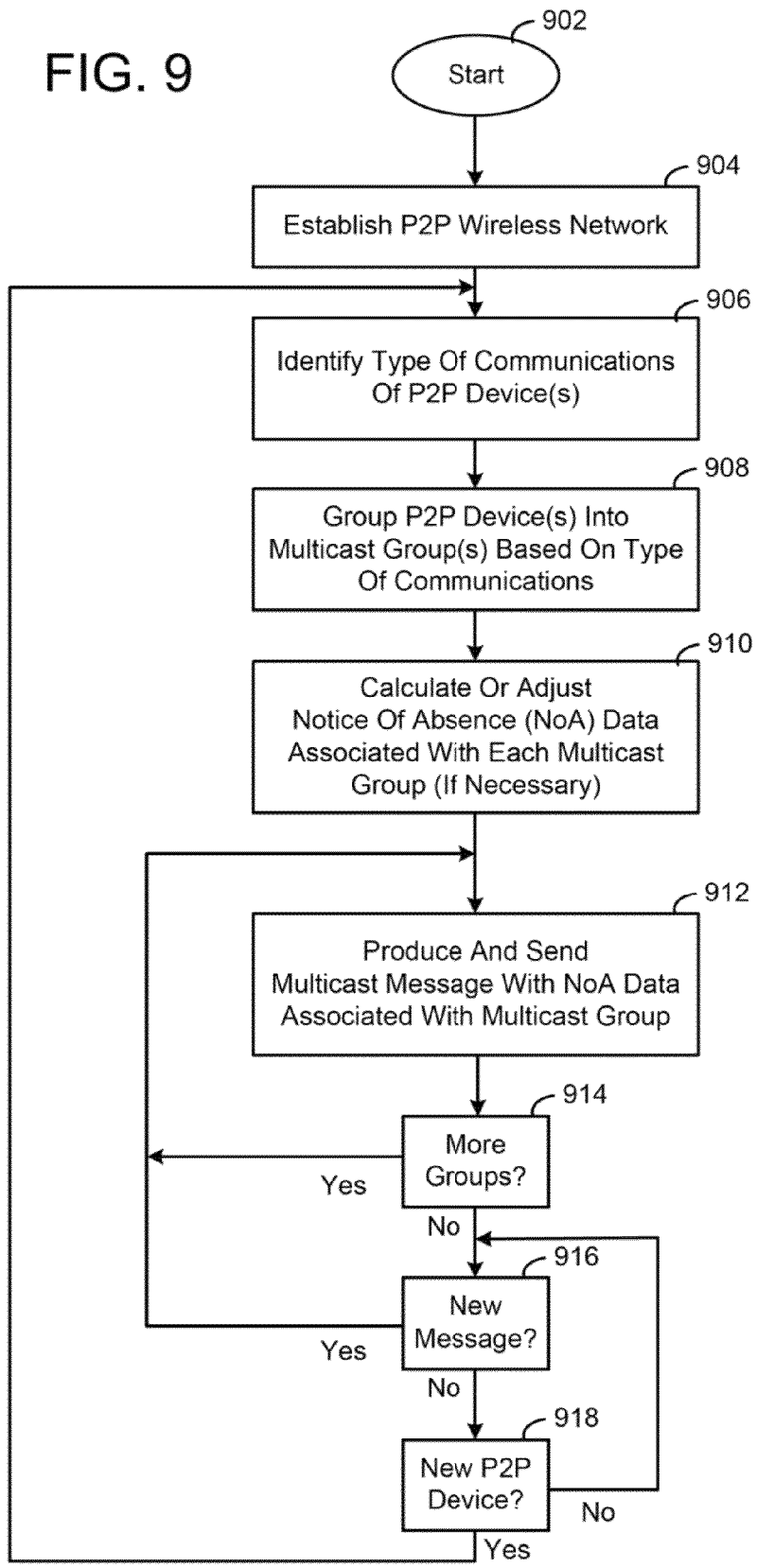
FIG. 9 is a flowchart for describing a method for use in communicating in a P2P network.

Referring now ahead to FIG. 9, what is shown a flowchart for describing a method for use in communicating in a P2P network. The method of FIG. 9 may be performed by wireless device 201 described in relation to FIGS. 1-8 above. In such technique, the wireless device may operate substantially in accordance or compatible with the Wi-Fi P2P network protocols in the Wi-Fi Peer-To-Peer (P2P) Technical specification.

The techniques described in relation to the flowchart of FIG. 9 may be performed by one or more controllers or processors of the wireless device along with its wireless or RF transceiver(s). A computer program product which may embody the technique may include a computer readable medium (e.g. memory of the communication device, computer disk, CD-ROM, etc.) having computer instructions stored therein which are executable by the one or more processors of the wireless device for performing the technique.

Beginning at a start block 902 of FIG. 9, a wireless device operates to establish a P2P network with other P2P devices (step 904 of FIG. 9). Here, the wireless device operates in an access point "AP" mode of operation, so that P2P devices may associate with it for direct RF communications. Data may be communicated directly between the P2P devices without the data traversing any fixed wireless network infrastructure. For this purpose, the wireless device may operate as a group owner (GO) in the P2P network. For example, the wireless device may operate as a GO (substantially) in accordance with or compatible with the Wi-Fi Peer-To-Peer (P2P) Technical specification.

In addition, the wireless device may perform concurrent operations as a client station with another AP (see e.g. the discussion in relation to FIG. 7). In order to communicate with this other AP as a client station, the wireless device must temporarily cease communications with the P2P devices. Further, in order to ensure that the P2P devices will not attempt to communicate with the wireless device while it communicates with the other AP, the wireless device communicates the times during which it will be absent or unavailable for communications with the P2P devices. This operation will be described in more detail below.

Next, the wireless device identifies the type of communications which are established (or to be established) with each one of the P2P devices (step 906 of FIG. 9). There may be a plurality of different types of communications established between the P2P devices and the group owner. For example, the type of communications may be defined by (at least in part) a (minimum) bandwidth requirement for the communications.

In some embodiments, the type of communications may be identified by a traffic class or Quality of Service (QoS) criteria associated with the communications.

Note that a traffic class may be a conversational or voice traffic class, a streaming traffic class, an interactive traffic class, or a background traffic class. A conversational or voice traffic class is associated with traditional voice communications, which are usually two-way and sensitive to delay, delay variation, and data loss. A streaming traffic class is typically associated with one-way communications which are less sensitive to delay and data loss, but are sensitive to delay variations and typically require a high bandwidth. An example of streaming traffic class is a video player application. On the other hand, an interactive traffic class is typically associated with two-way "bursty" types of communications. These communications can tolerate moderate delay and data loss and have variable bandwidth requirements. On-line video game and web-surfing (browser) applications are examples of the interactive traffic class. Finally, a background traffic class is typically associated with communications which are highly tolerant of delay and data loss and may have variable bandwidth requirements. Examples of these applications include e-mail and file transfer applications.

The wireless device assigns or groups the P2P devices into different multicast groups (step 908 of FIG. 9). In some embodiments, the wireless device assigns or groups the P2P device into different multicast groups based on the identifying in step 906. More particularly, the wireless device assigns or groups one or more P2P devices having the same (or substantially the same) type of communications into the same multicast group. Thus, each multicast group is associated with the same (or substantially the same) type of communications, but with a different type of communications from all other multicast groups.

In some embodiments, each multicast group may simply include one or more P2P devices determined to have a bandwidth requirement within a predetermined range. In some other embodiments, each multicast group may include one or more P2P devices having communications with the same traffic class or QoS criteria. For example, the wireless device may group one or more first P2P devices having communications associated with a voice traffic class into a first multicast group, and one or more second P2P devices having communications associated with a streaming traffic class into a second multicast group.

In the technique, a multicast address is assigned to each one of the multicast groups. The assignment and communication of the multicast address may be done in any suitable manner. In some embodiments, a multicast address may be determined and communicated by the group owner when each P2P device joins the group (e.g. the assignment may be communicated in an association frame). In some other embodiments, the multicast address may be negotiated between P2P devices using a new Public Action frame (e.g. a newly-defined frame named "NoAGroupRequest/Response" frame). In yet other embodiments, a multicast address may be determined and communicated as part of an application or service, where the application or service includes information indicating the traffic class or QoS criteria. Here, there may be a multicast group assigned to each application type (e.g. printing, video streaming, VoIP, etc.).

The wireless device then calculates (or otherwise determines or selects) different Notice of Absence (NoA) data for each multicast group (step 901 of FIG. 9). Each NoA data includes at least a time period of absence for communicating with the P2P devices of the multicast group. If communications are necessary, the wireless device will communicate with the P2P devices outside of the time period of absence from the first. NoA data.

In some embodiments, the NoA data may be or include a NoA attribute. The NoA attribute may be defined in the Wi-Fi Peer-To-Peer (P2P) Technical specification, for example. Here, the NoA attribute includes a start time, an interval, a duration, and a count. In some embodiments, the durations of absence for each multicast group are set to be different, but the start times, the intervals, and the counts are set to be the same for each multicast group. In some other embodiments, the counts may be set to be different for each multicast group.

The duration of absence for each multicast group may be determined based on the (minimum) bandwidth requirement for the multicast group. More particularly, the duration of absence for a multicast group may be calculated to be inversely related to the bandwidth requirement for the multicast group. For example, the multicast group with the largest bandwidth requirement may be calculated to have the smallest duration of absence. The counts may similarly be varied.

The wireless device then produces and sends a multicast message with the NoA data associated with a multicast group (step 912 of FIG. 9). In order to communicate with all of the P2P devices in the multicast group, the multicast message includes the multicast address associated with the group (see e.g. FIG. 8). If there are one or more additional multicast groups to be processed as identified at step 914 of FIG. 9, the wireless device will produce and send a multicast message with the NoA data associated with this additional multicast group, repeating step 912.

Multicast addressing is now discussed with reference back to FIG. 8, which is an illustration of a format of a message including an address field 800 which may be populated with an address for multicast messaging. The address may be referred to as a MAC address or a layer-2 address. MAC is used for access to the physical layer from the data link layer according to the ISO/OSI model. Address field 800 may include an indication which indicates whether the address is a unicast address or a multicast address. The indication may be a bit indication in address field 800 (e.g. the least significant bit of the most significant octet of the address). If the least significant bit of the most significant octet of the address is set to zero ("0"), the frame is intended to reach only a single receiving device. This type of communication or addressing may be referred to as unicast communication or addressing. Here, a unicast frame is transmitted to all nodes within the collision domain, which typically ends at the nearest network switch or router. Only the node with, the matching hardware MAC address will accept the frame, and network frames with non-matching MAC addresses are ignored. On the other hand, if the least significant bit of the most significant octet of the address is set to one ("1"), the frame will still be sent only once; however, devices may accept the frame based on different criteria than a matching MAC address. For example, devices may accept the frame based on a configurable list of accepted multicast MAC addresses. This type of communication or addressing may be referred to as multicast communication or addressing.

In some embodiments, wireless device may send such messages in a beacon frame in step 912 of FIG. 9. In IEEE 802.11, a typical beacon frame is approximately fifty bytes long, with about half of that being a common frame header and cyclic redundancy checking (CRC) field for error detection capability. The beacon frame body resides between the header and the CRC field and constitutes the other half of the beacon frame. As with other frames, the header includes source and destination MAC addresses as well as other information regarding the communications process. For traditional broadcasts, the destination address is set to all ones, which is the broadcast MAC address. This causes all stations on the channel to receive and process each beacon frame. Using multicast groups per the present disclosure, the destination address is set to a multicast address associated with the specific multicast group.

In some embodiments, a plurality of multicast groups may be communicated in a single beacon. This may be done, for example, by communicating with use of an existing or newly-defined IEEE 802.11 element. The newly-defined IEEE 802.11 element may have the following format, for example:

---
Element ID: TBD value - an integer assigned by
IEEE or a vendor specific element
Length: 3-255 octets
Number of NoA Groups: variable - the number of
NoA Groups
Group 1: NoA Address - 6 octet group
(multicast) address; NoA Schedule element (as per
Wi-Fi P2P Specification)
Group 2: . . .
Group N
---

In other embodiments, the wireless device may send a group (multicast) management frame which includes the NoA data for a specific multicast group.

Continuing with FIG. 9, if there is a new message to be processed (step 916 of FIG. 9), then the wireless device repeats steps 912 and 914 for again producing and sending the messages. If a new P2P device has entered in the P2P network (step 918 of FIG. 9), the wireless device repeats the technique at step 906 (i.e. to identify the type of communications for any new P2P device), step 908 (i.e. to group the P2P devices into different multicast groups), step 910 (i.e. to calculate or adjust the NoA data for each multicast group), etc. Otherwise, the technique repeats step 916. Note that step 918 may additionally or alternatively include identifying whether an existing P2P device has left the P2P network, whether the type of communications for an existing P2P device has changed to a different type of communications, or some or all of the above.

Figure 10:
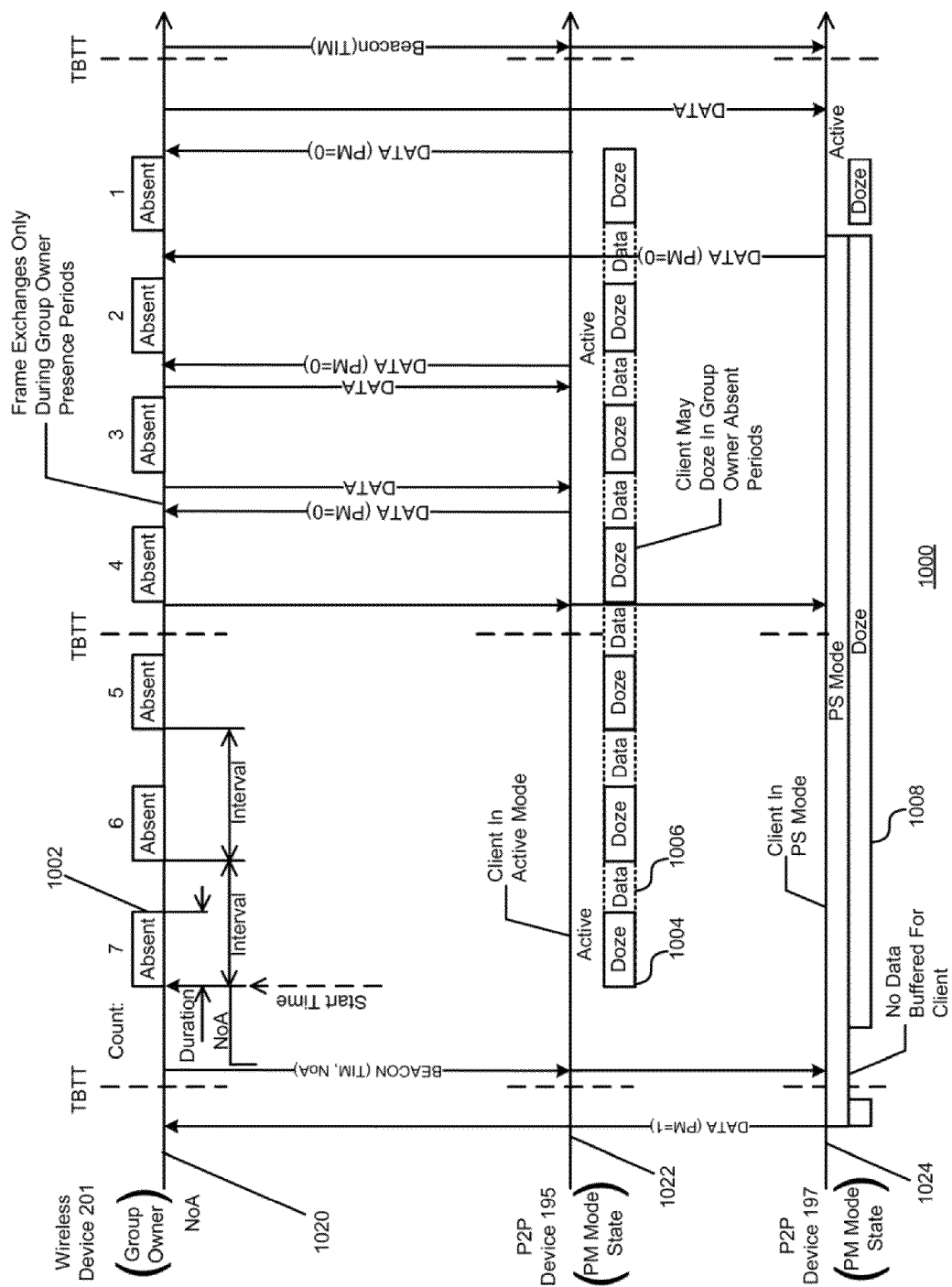
FIG. 10 is a timing diagram of communications involving the wireless device operating as a group owner in a P2P network, scheduling absences in the P2P network by communicating NoA data without use of the technique of FIG. 9.

FIG. 10 is a timing diagram 1000 of communications involving the wireless device 201 operating as a group owner (GO) in a P2P network, scheduling absences in the P2P network by communicating NoA data in a broadcast message, without use of the technique of FIG. 9. A time line 1020 depicts communications for the wireless device 201 which is the group owner, a time line 1022 depicts communications for P2P device 195, and a time line 1024 depicts communications for P2P device 197. P2P device 195 is operating in active mode, whereas P2P device 197 is operating in power saving (PS) mode. For wireless device 201, time line 1020 illustrates the absence period (e.g. an absence period 1002), data or communication periods (e.g. a data or communication period 1003), the intervals, the durations, and the counts. In the active state, P2P device 195 places itself in a doze state during a doze period 1004 corresponding to each absence period 1002, and exits the doze state and communicates (if necessary) in each data period 1006 which follows the doze period 1004. In the PS mode, P2P device 197 places itself in a doze state during a doze period 1008 which spans across multiple absence periods of the wireless device 201.

Figure 11:
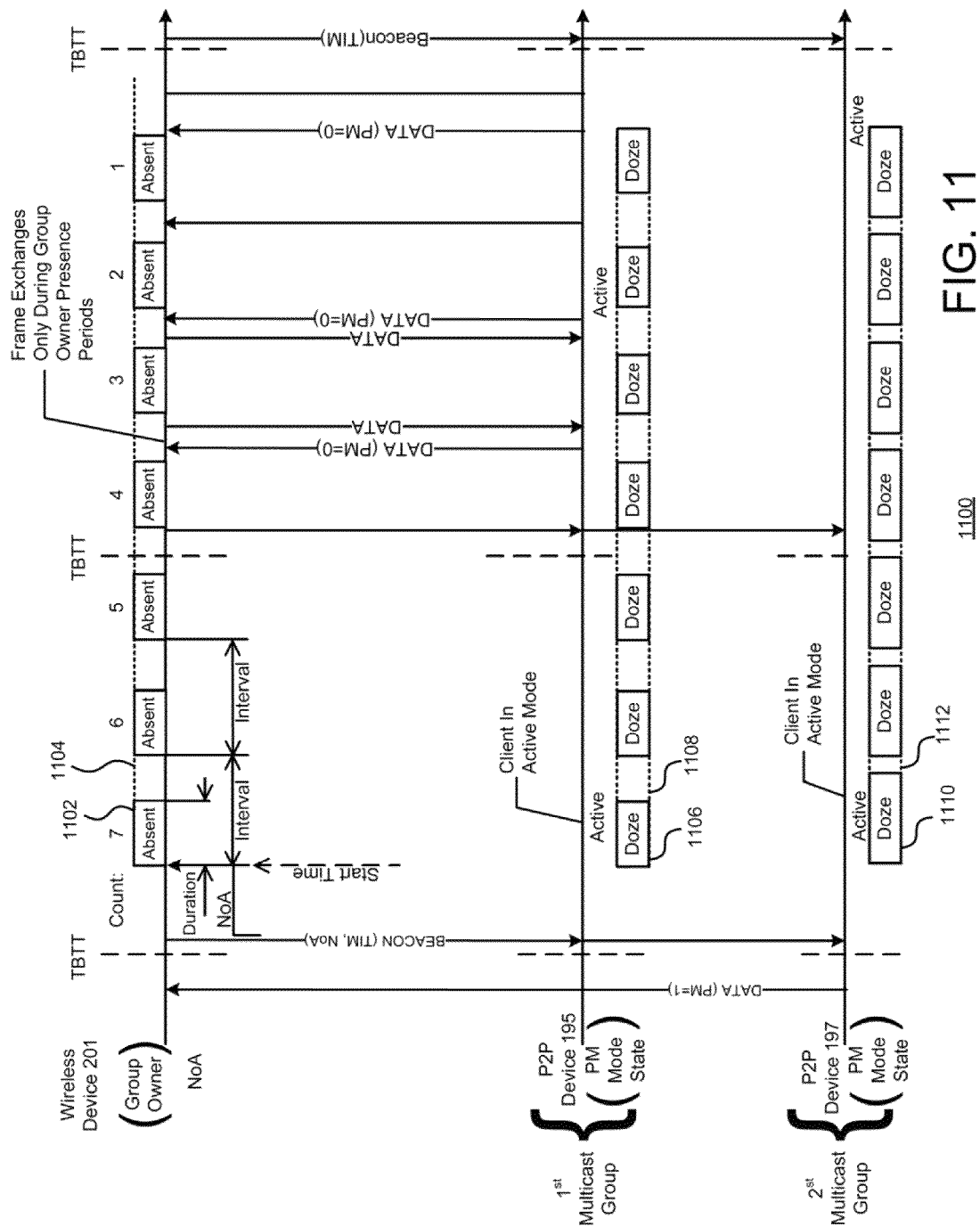
FIG. 11 is another timing diagram of communications involving the wireless device operating as a group owner in a P2P network, scheduling absences in the P2P network by communicating different NoA data to different multicast groups using the technique of FIG. 9.
Figure 12:
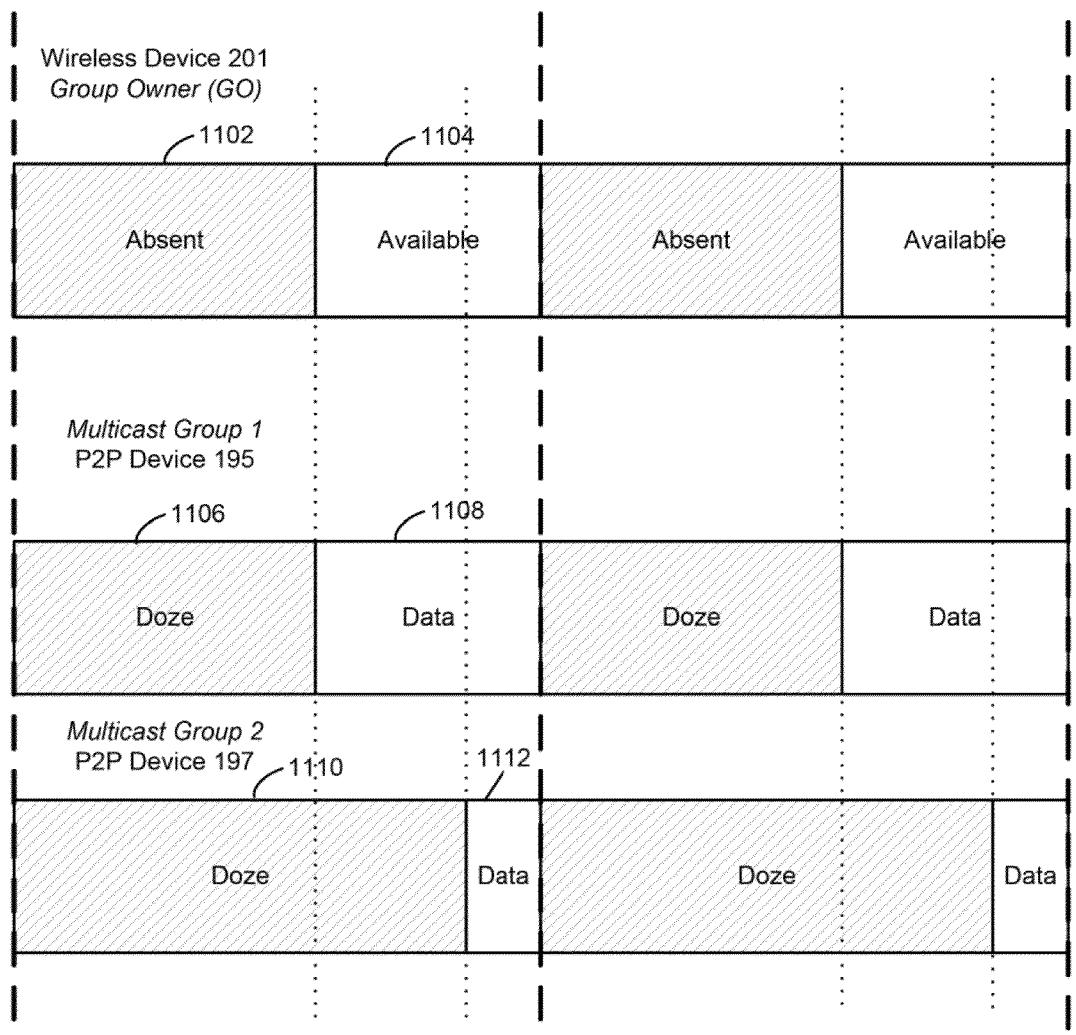
FIG. 12 is a close-up of a portion of the timing diagram of FIG. 11, showing the differences in doze periods of the different multicast groups based on the different NoA data.

FIG. 11 is another timing diagram 1100 of communications involving the wireless device operating as a group owner in a P2P network, scheduling absences in the P2P network by communicating different NoA data to different multicast groups, using the technique of FIG. 9 and the present disclosure. Relatedly, FIG. 12 is a close-up of a portion of the timing diagram 1100 of FIG. 11, showing the differences in doze periods of the different multicast groups, which is based on the different NoA data. The timing diagram 1100 shows the absence periods (e.g. an absence period 1102), data or communication periods (e.g. a data or communication period 1104), the intervals, the durations, and the counts.

In the present embodiment, P2P device 195 is in a first multicast group and P2P device 197 is in a second multicast group. In the timing diagram 110, both P2P devices 195 and 197 are operating in the active mode. P2P device 195 of the first multicast group places itself in a doze state during a doze period 1106 corresponding to each absence period 1102, and exits the doze state and communicates (if necessary) in each data period 1108 which follows the doze period 1106. On the other hand, P2P device 197 of the second multicast group places itself in a doze state during a doze period 1110 and exits the doze state and communicates (if necessary) in each data period 1112 which follows the doze period 1110.

As mentioned, the wireless device 201 operating as the group owner sends different NoA data to the first and the second multicast groups. In particular, the first multicast group which includes P2P device 195 receives a first absence period from the wireless device 201, and the second multicast group which includes P2P device 197 receives a second absence period from the wireless device 201 that is greater than the first absence period received by the first multicast group.

In this example, the first multicast group may be of the voice or conversational traffic class and/or or have a relatively low minimum bandwidth requirement, whereas the second multicast group may be of the streaming traffic class and/or have a relatively high minimum bandwidth requirement.

Thus, as described herein, a wireless device is configured to operate as a group owner (GO) in a peer-to-peer (P2P) network. The wireless device sends a first multicast message to one or more first P2P devices in the P2P network. The first multicast message includes first notice of absence (NoA) data. The wireless device also sends a second multicast message to one or more second P2P devices in the P2P network. The second multicast message includes second notice of absence (NoA) data. Partitioning in the P2P network in this fashion may be set based on the different types of communications established for the P2P devices (e.g. the different traffic classes or Quality of Service (QoS) types).

In addition, other techniques for a wireless peer-to-peer (P2P) device which is configured to communicate in a P2P network having a group owner (GO) are described. In one illustrative example, a technique involves the actions of receiving from the group owner a multicast message which includes notice of absence (NoA) data. The NoA data includes a time period of absence from the P2P network. The wireless P2P device may communicate with the group owner outside of the time period of absence indicated in the NoA data of the multicast message. On the other hand, the wireless P2P device refrains from communicating with the group owner during the time period of absence in the NoA data of the multicast message. The time period of absence with the group owner may be based on the type of communications established with the wireless P2P device (i.e. the traffic class or Quality of Service (QoS) type).

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e. IEEE 802.16), or an Ultra-WideBand (UWB) network (i.e. IEEE 802.15). The invention described herein in the recited claims intends to cover and embrace all suitable changes in technology.

What is claimed is:

1. A method in a wireless device which is configured to operate as a group owner (GO) in a peer-to-peer (P2P) network, the method comprising:
    sending a first multicast message to a first multicast group comprising one or more first P2P devices in the P2P network, the first multicast message including first notice of absence (NoA) data, the first NoA data being for use by the first multicast group and indicating a first time period of absence to cause the one or more first P2P devices of the first multicast group to refrain from communicating with the GO during the first time period of absence; and
    sending a second multicast message to a second multicast group comprising one or more second P2P devices in the P2P network, the second multicast message including second NoA data, the second NoA data being for use by the second multicast group and indicating a second time period of absence, different from the first time period of absence, to cause the one or more second P2P devices of the second multicast group to refrain from communicating with the GO during the second time period of absence;
    the respective first NoA data and the second NoA data being useable concurrently by the first and second multicast groups.

2. The method of claim 1, further comprising:
    identifying that the first multicast group is defined to comprise one or more first P2P devices that are associated with a first type of communications;
    identifying that the second multicast group is defined to comprise one or more second P2P devices that are associated with a second type of communications; and
    calculating the first and the second time periods of absences based on the first and the second types of communications.

3. The method of claim 1, wherein the first multicast group is defined to comprise one or more first P2P devices that have communications associated with a first traffic class or first Quality of Service (QoS) criteria, and the second multicast group is defined to comprise one or more second P2P devices that have communications associated with a second traffic class or second first QoS criteria.

4. The method of claim 3, further comprising:
    identifying that the first multicast group is defined to comprise one or more first P2P devices that have communications associated with the first traffic class or the first QoS criteria; and
    identifying that the second multicast group is defined to comprise one or more second P2P devices that have communications associated with the second traffic class or the second QoS criteria.

5. The method of claim 4 further comprising:
    calculating the first NoA data for the first multicast group in response to identifying the association with the first traffic class or the first QoS criteria; and
    calculating the second NoA data for the second multicast group in response to identifying the association with the second traffic class or second QoS criteria.

6. The method of claim 1, wherein at least the first multicast message is included in a beacon frame.

7. The method of claim 1, further comprising:
communicating with the first multicast group outside of the first period of absence indicated in the first NoA data; and
communicating with the second multicast group outside of the second period of absence indicated in the first NoA data.

8. The method of claim 7, wherein the first NoA data comprises a first NoA attribute which includes a first start time, a first interval, a first duration, and a first count field, and wherein the second NoA data comprises a second NoA attribute which includes a second start time, a second interval, a second duration, and a second count field.

9. The method of claim 1, wherein each of the first and second multicast groups is associated with a different communications characteristic, and wherein the first and second NoA data are determined based on the different communications characteristics of each multicast group.

10. A wireless communication device, comprising:
one or more processors;
a radio frequency (RF) transceiver coupled to the one or more processors;
the one or more processors being configured to operate the wireless communication device as a group owner (GO) in a peer-to-peer (P2P) network by:
sending via the RF transceiver a first multicast message to a first multicast group comprising one or more first P2P devices in the P2P network, the first multicast message including first notice of absence (NoA) data, the first NoA data being for use by the first multicast group and indicating a first time period of absence to cause the one or more first P2P devices of the first multicast group to refrain from communicating with the GO during the first time period of absence; and
sending via the RF transceiver a second multicast message to a second multicast group comprising one or more second P2P devices in the P2P network, the second multicast message including second NoA data, the second NoA data being for use by the second multicast group and indicating a second time period of absence, different from the first time period of absence, to cause the one or more second P2P devices of the second multicast group to refrain from communicating with the GO during the second time period of absence;
the respective first and second NoA data being useable concurrently by the first and second multicast groups.

11. The wireless communication device of claim 10, wherein the first multicast group is defined to comprise one or more first P2P devices that have communications associated with a first traffic class or a first Quality of Service (QoS) criteria, and the second multicast group is defined to comprise one or more second P2P devices that have communications associated with a second traffic class or a second QoS criteria.

12. The wireless communication device of claim 11, wherein the one or more processors are further configured to:
identify that the first multicast group is defined to comprise one or more first P2P devices that have communications associated with the first traffic class or the first QoS criteria; and
identify that the second multicast group is defined to comprise one or more second P2P devices that have communications associated with the second traffic class or the second QoS criteria.

13. The wireless communication device of claim 12, wherein the one or more processors are further configured to:
calculate the first NoA data for the first multicast group in response to identifying the association with the first traffic class or the first QoS criteria; and
calculate the second NoA data for the second multicast group in response to identifying the association with the second traffic class or the second QoS criteria.

14. The wireless communication device of claim 10, wherein at least one of the first and the second multicast messages are included in a beacon frame.

15. The wireless communication device of claim 10, wherein the one or more processors are further configured to:
identify that the first multicast group is defined to comprise one or more first P2P devices that are associated with a first type of communications;
identify that the second multicast group is defined to comprise one or more second P2P devices that are associated with a second type of communications; and
calculate the first and the second time periods of absences based on the first and the second types of communications.

16. A method in a wireless peer-to-peer (P2P) device which is configured to communicate in a P2P network having a group owner (GO), the P2P device being associated with a first multicast group, the method comprising:
receiving from the group owner a beacon directed to at least the first multicast group and a second multicast group, the beacon including first notice of absence (NoA) data for use by the first multicast group and second NoA data for use by the second multicast group, the first NoA data indicating a first time period of absence to cause the first multicast group to refrain from communicating with the GO during the first time period of absence, and the second NoA data indicating a second time period of absence, different from the first time period of absence, to cause the second multicast group to refrain from communicating with the GO during the second time period of absence, the respective first and second NoA data being useable concurrently by the first and second multicast groups;
determining, from the beacon, the first NoA data for the first multicast group; and
refraining from communicating with the group owner during the first time period of absence indicated in the first NoA data.

17. The method of claim 16, further comprising:
entering into a doze state during the first time period of absence indicated in the first NoA data.

18. The method of claim 16, wherein the first time period of absence has been set in accordance with a type of communications established with the P2P device.

19. The method of claim 16, wherein the first time period of absence has been set in accordance with a traffic class or Quality of Service (QoS) criteria of communications of the P2P device.

20. The method of claim 16, wherein the first time period of absence has been set to be inversely related to a bandwidth requirement of communications of the P2P device via the group owner.

21. The method of claim 16, further comprising:
communicating with the group owner outside of the first time period of absence indicated in the first NoA data.

22. A wireless communication device, comprising:
one or more processors;
a radio frequency (RF) transceiver coupled to the one or more processors;
the one or more processors being operative to communicate in a peer-to-peer (P2P) network having a group owner (GO), the device being associated with a first multicast group, the one or more processors being configured to:

receive via the RF transceiver from the group owner a beacon directed to at least the first multicast group and a second multicast group, the beacon including first notice of absence (NoA) data for use by the first multicast group and second NoA data for use by the second multicast group, the first NoA data indicating a first time period of absence to cause the first multicast group to refrain from communicating with the GO during the first time period of absence, and the second NoA data indicating a second time period of absence, different from the first time period of absence, to cause the second multicast group to refrain from communicating with the GO during the second time period of absence, the respective first and second NoA data being useable concurrently by the first and second multicast groups;

determining, from the beacon, the first NoA data;

communicate via the RF transceiver with the group owner outside of the first time period of absence indicated in the first NoA data; and refrain from communicating with the group owner during the first time period of absence indicated in the first NoA data.

\* \* \* \* \*